US009440224B2

United States Patent
Goia et al.

(10) Patent No.: US 9,440,224 B2
(45) Date of Patent: *Sep. 13, 2016

(54) CATALYST PARTICLES COMPRISING HOLLOW MULTILAYERED BASE METAL-PRECIOUS METAL CORE/SHELL PARTICLES AND METHOD OF THEIR MANUFACTURE

(71) Applicant: UMICORE AG & CO. KG, Hanau-Wolfgang (DE)

(72) Inventors: Dan V. Goia, Potsdam, NY (US); Igor V. Sevonkaev, Potsdam, NY (US); Daniel Herein, Frankfurt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 788 days.

This patent is subject to a terminal disclaimer.

(21) Appl. No.: 13/718,993

(22) Filed: Dec. 18, 2012

(65) Prior Publication Data
US 2014/0171297 A1 Jun. 19, 2014

(51) Int. Cl.
*B01J 23/89* (2006.01)
*B82Y 40/00* (2011.01)

(52) U.S. Cl.
CPC ............... *B01J 23/892* (2013.01); *B82Y 40/00* (2013.01); *Y10S 977/773* (2013.01); *Y10S 977/81* (2013.01); *Y10S 977/892* (2013.01)

(58) Field of Classification Search
CPC ...... B01J 23/89; B01J 23/896; B01J 23/892; B01J 37/08; Y10S 977/73; Y10S 977/81
See application file for complete search history.

(56) References Cited

U.S. PATENT DOCUMENTS 5,085,693 A 2/1992 Josso et al.
7,053,021 B1 5/2006 Zhong et al.
(Continued)

FOREIGN PATENT DOCUMENTS

EP 0 423 005 A1 4/1991
EP 1 524 711 A2 4/2005
(Continued)

OTHER PUBLICATIONS

Gan et al. (Core-Shell Compositional Fine Structures of Dealloyed PtxNi1-x Nanoparticles and Their Impact on Oxygen Reduction Catalysis, Nano Letters, 2012, 12: 5423-5430).*
Wang et al., Correlation Between Surface Chemistry and Electrocatalytic Properties of Monodisperse PtxNi1-x nanoparticles, Adv. Funct. Mater. 2011, 21, 147-152.*
Zhang, J. Physical Chem B, 2005, 109, 22701-22704.
(Continued)

*Primary Examiner* — Jun Li
(74) *Attorney, Agent, or Firm* — Levin Santalone LLP; John Santalone

(57) ABSTRACT

The present invention is directed to hollow catalyst particles comprising a layered shell structure and to a method of their manufacture. The catalyst particles have the general formula $H_{core}/PM_{inner\ shell}/IL/PM_{outer\ shell}$ in which $H_{core}$ is the hollow core, $PM_{inner\ shell}$ is a precious metal forming the innermost layer of the shell, IL is an intermediate layer comprising a base metal/precious metal alloy, and $PM_{outer\ shell}$ is a precious metal forming the outermost layer of the shell. The precious metal is selected from Pt, Ir and Pd and mixtures or alloys thereof, and IL is an intermediate layer comprising a base metal/precious metal alloy wherein the concentration of the base metal changes from the periphery of the hollow core to the outer surface of the intermediate layer. The base metal is selected from Co, Ni, and Cu and mixtures thereof.

23 Claims, 6 Drawing Sheets

(56) References Cited

U.S. PATENT DOCUMENTS

| | | |
|---|---|---|
| 7,211,126 B2 | 5/2007 | Kim et al. |
| 7,223,493 B2 | 5/2007 | Terada et al. |
| 8,227,372 B2 | 7/2012 | Lopez et al. |
| 8,288,308 B2 | 10/2012 | Lopez et al. |
| 8,304,362 B2 | 11/2012 | Lopez et al. |
| 2011/0177432 A1 | 7/2011 | Erlebacher et al. |
| 2012/0238443 A1 | 9/2012 | Goia et al. |
| 2012/0316054 A1 | 12/2012 | Lopez et al. |
| 2013/0177838 A1* | 7/2013 | Wang .................. B01J 23/52 429/524 |
| 2014/0171290 A1 | 6/2014 | Lopez |

FOREIGN PATENT DOCUMENTS

| | | |
|---|---|---|
| EP | 2 743 273 A1 | 6/2014 |
| WO | 2012/009467 | 1/2012 |
| WO | 2012/123442 A1 | 9/2012 |

OTHER PUBLICATIONS

Brankovic, Electrochem Solid St Ltr, 2001, 4(12), A217-A220.
Carroll, J Phys Chem, C 2011, 115, 2656-2664.
Chinnasamy, J Appl Phys 2005, 97, 10J309.
Rao, Phase Transit 2012, 85, 235-243.
Chen, J Phys Chem 2008, 112, 1645-1649.
Sobal, J Phys Chem B, 2003, 107, 7351-7354.
Felin M G, et al.: "Oxidation-reduction properties of platinum complexes of the amino type," Bulletin of the Academy of Sciences of the USSR, Div. Chem. Sc., Bd. 21, Nr. 4, 1972, Seiten 880-882, XP002698522, ISSN: 1573-9171, DOI: 10.1007/BF00854492 (English abstract).
Knyazeva, N. N. et al: "Association of some complexes of platinum(II) and palladium(II) with anions in aqueous solutions", XP002698523, gefunden im STN Database accession No. 1979:410128 (English abstract).
{Phen2}C2O4*2H2O: reaxys registry No. 17015647 (abstract).

* cited by examiner

Figure 5a
Figure 5b
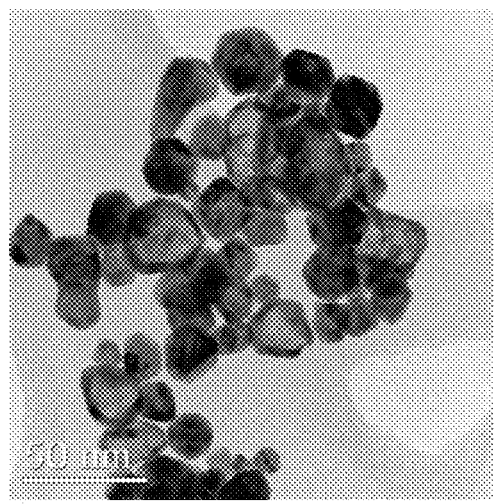
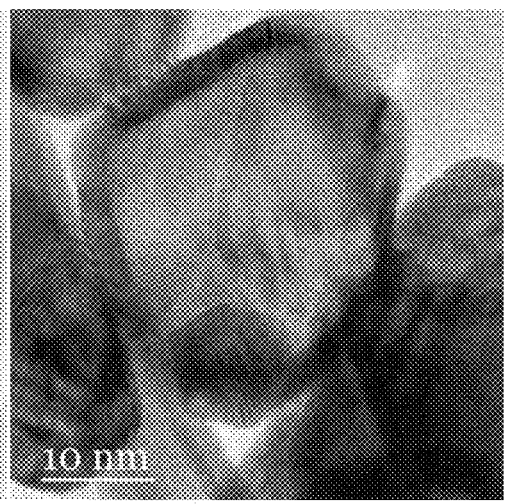
Figure 6
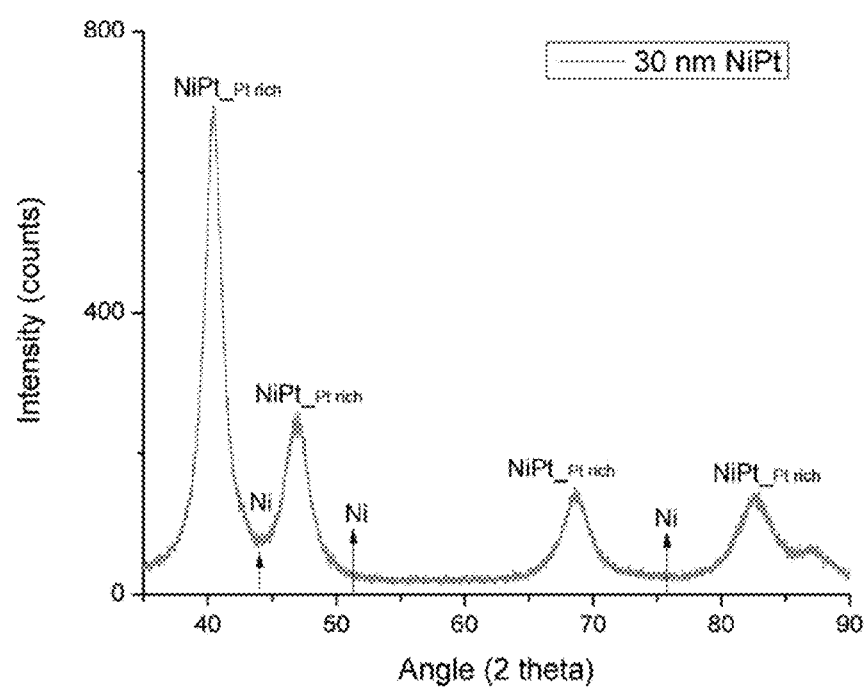

CATALYST PARTICLES COMPRISING HOLLOW MULTILAYERED BASE METAL-PRECIOUS METAL CORE/SHELL PARTICLES AND METHOD OF THEIR MANUFACTURE

BACKGROUND OF THE INVENTION

The present invention is directed to hollow catalyst particles comprising a layered shell structure (also called "hollow spheres") and to a method of their manufacture. The advanced hollow particles comprising a layered shell structure contain precious metals and find use in various catalytic applications, for example in gas-phase catalysis, in electrocatalysts for fuel cells or in catalytic converters for automobiles. They may also be useful in variety of other applications such as, e.g., in electronic or medical applications. The hollow spheres according to the present invention may be manufactured by forming a base metal core in the first step, depositing a precious metal onto said core in the second step, thus obtaining core/shell type particles, and removing the base metal core in the last step.

Electrocatalysts for fuel cells in automotive applications are generally based on nanoparticles (medium size <10 nm) of platinum alloys supported on high surface area supports (e.g. carbon blacks). To become commercially competitive it is still necessary to improve the activity of the platinum based catalysts even further than currently achieved with PtCo alloys.

In the present invention, the term "alloy" means a partial or complete metallic solid solution.

Core/shell-type catalyst particles such as, for example, Pt-coated Ni particles or Pt-coated Co particles gain increased importance and find use as catalysts for fuel cells or electrode materials for batteries. Especially the particles with a Pt-based shell reveal a high specific activity. As an advantage, they possess low precious metal contents due to the core/shell structure. The catalyst particles are characterized by a high specific mass activity ("SMA") and an improved performance in oxygen reduction reactions ("ORR") at the cathode of PEMFCs (Polymer electrolyte membrane fuel cells) or DMFCs (Direct methanol fuel cells). However, precious metal atoms which are not located at the surface of said core/shell particles are not accessible for catalytic reactions.

Hereinafter, the terms "precious metal" and "noble metal" are used synonymously.

J. Zhang et al. reported the preparation of core/shell particles as electrocatalysts for oxygen reduction. The core comprises of an alloy of a precious metal, whereas the shell consists of a Pt monolayer deposited by under potential deposition ("UPD"); ref to J. Zhang, F. H. B Lima et al, Journal of Physical Chemistry B Letters, 2005, 109, 22701-22704. The catalyst thus obtained is a $Pt_{ML}X/C$ (X=Au, Ag, Pd; ML=monolayer) with the metal particles comprising an inner core consisting of metal X and a monolayer of platinum in form of a shell on top of it.

Core/shell catalysts comprising a ruthenium core coated with platinum were described some years ago (ref to S. R. Brankovitch, J. X. Wang and R. R. Adzic, Electrochemical and Solid State Letters 2001, 4, A217-A220). The medium particle size of the Ru/Pt core/shell particles is in the range of 2.5 nm (by TEM).

U.S. Pat. No. 7,053,021 B1 teaches the preparation of carbon-supported core/shell nano-particles of 1-3 nm size comprising a platinum-vanadium-iron alloy. An improvement by the factor of 2-4 is reported. Again, this improvement is still not sufficient to meet the targets of the automotive industry.

Examples for core/shell-type catalysts, primarily for use as electrocatalysts in fuel cells are disclosed in U.S. Pat. No. 8,227,372, U.S. Pat. No. 8,288,308, U.S. Pat. No. 8,304,362 and US 2012/0316054 to the same applicant. These core/shell particles comprise a metal or ceramic core material and at least three atomic layers of platinum in their shell.

The formation of base metal cores is often performed by reducing a base metal salt in a polyol. An example for the formation of Ni and Cu nanoparticles by the polyol method is described in K. J. Carroll, J. U. Reveles, M. D. Shultz, S. N. Khanna and E. E. Carpenter, J Phys Chem C 2011, 115, 2656-2664. Nickel occurs in two allotropes: the face-centered cubic (fcc) crystal structure and the hexagonal close packed (hcp) structure. Said paper describes the formation of fcc Ni nanoparticles. The synthesis and magnetic properties of fcc and hcp Ni nanoparticles through the polyol process are described in C. N. Chinnasamy, B. Jeyadevan, K. Shinoda and K. Thoji, J. Appl. Phys., 2005, 97, 10J309 and in K. S. Rao, T. Balaji, Y. Lingappa, M. R. R. Reddy and T. L. Prakash, Phase Transit 2012, 85, 235-243.

The formation of Ni@Pt core/shell nanoparticles is described in Y. Chen, Y. Dai, W. Wang, and S. Chen, J. Phys. Chem. C 2008, 112, 1645-1649: a Ni salt is reduced in a polyol, then $H_2PtCl_6$ is added dropwise to form a Pt monolayer shell. However, this method is not suitable for the manufacturing of multilayered core/shell particles comprising a base metal/precious metal alloy.

WO 2012/123442 A1, also published as US 2012/0238443 A1 to the same applicant is directed to a method for manufacture of metal nanoparticles, in particular to the manufacture of nano-sized base metal particles. The manufacturing method of this invention is based on the "seed particle method" or "seed-mediated method". By this method, size-controlled base metal particles with a medium particle diameter in the range of 20 to 200 nm can be produced using small precious metal seed particles ("nuclei") to initiate the particle formation. Such particles are preferably used as starting material in the present invention.

U.S. Pat. No. 7,211,126 B2 discloses a method for preparing non-magnetic nickel powders. Nickel with an fcc structure is ferromagnetic, whereas hcp nickel is non-magnetic. The fcc crystal structure is also known as cubic close packed (ccp); these are two different names for the same lattice. In U.S. Pat. No. 7,211,126 B2, a nickel precursor and a polyol are mixed and heated at 45° C. to 350° C. to form fcc nickel particles in the first step. In all embodiments of said disclosure, this first step is carried out at 190° C. for 10 min to 1 h. In a second step, the fcc particles obtained by the first step were heated at 190° C. for 24 h to form hcp nickel. By contrast to U.S. Pat. No. 7,211,126 B2, the inventors of the present invention found that the formation of fcc or hcp Ni depends on both the reaction time and the temperature. The higher the temperature, the less time is needed to form hcp Ni and vice versa. Furthermore, the inventors of the present invention found that the formation of hcp Ni by reducing $Ni^{2+}$ salts in a polyol does not necessarily require a two-step process. If an appropriate combination of reaction time and temperature is chosen, a one-step process leads to hcp Ni likewise.

WO 2012/009467 A1 discloses hollow metal nanoparticles and methods for their manufacture, wherein the nanoparticles preferably comprise at least one noble metal. Said particles are manufactured by making solid core particles consisting of a less noble metal in a first step and adding a salt of a more noble metal in a second step. The less noble metal reduces the ions of the second, more noble metals. Since this method is quite slow, the formation of the noble metal shell is then continued by electrodeposition with an RDE setup. At the end of said process, the less noble metal has been dissolved in its entirety, and the remaining hollow particle consists of a discontinuous noble metal shell. The average particle diameter is 10 nm or less. By contrast to WO 2012/009467 A1, the present invention provides hollow spheres with average diameter of between 10 and 200 nm, preferable larger than 20 nm. Furthermore, the particles according to the present invention comprise a multi-layered shell that does not consist of pure precious metal, but comprises a base metal-precious metal alloy. The method for making said particles differs significantly from the method of WO 2012/009467 A1 as is does not comprise an electrodeposition step, and the base metal core is dissolved by acid leaching.

Leaching of solid solution metal alloys comprising a noble and a less noble metal to remove the less noble metal at least in part from the alloy is well known in the state of the art.

US 2011/0177432 A1 discloses a method of producing a porous metal comprising producing an alloy consisting essentially of platinum and nickel according to the formula $Pt_xNi_{1-x}$ wherein x is at least 0.01 and less than 0.3 and dealloying said alloy in a substantially pH neutral solution to reduce the amount of nickel in said alloy to produce said porous metal. The dealloying preferably occurs in a neutral electrolyte at potential greater than 2.1 V. According to this disclosure, dealloying in the NiPt system can also be done in acidic solutions, but the neutral solutions are benign.

EP 1 524 711 A2 discloses an electrode catalyst having a noble metal-containing particle deposited on an electroconductive carrier, wherein the noble metal-containing particle possesses a core-shell structure comprising a core part formed of a noble metal alloy and a shell part formed of a noble metal-containing layer different from the core part and formed on the periphery of the core part. The particle contains a noble metal and a transition metal. The method for the production of the catalyst comprises a step of depositing a noble metal-containing particle formed of a noble metal alloy on an electroconductive carrier and a step of exposing the surface of said particle to a solution capable of liquating a component other than noble metal, thereby forming a core-shell structure in said particle. The liquating agent is chosen from aqua regia, nitric acid, or concentrated sulfuric acid.

U.S. Pat. No. 7,223,493 B2 discloses a supported catalyst for a fuel cell containing a conductive support and a platinum alloy supported thereby. The catalyst is produced by first dispersing a support, e.g. a carbon support, in an aqueous solution of a platinum precursor, e.g. $H_2PtCl_6$, and then reducing the precursor to platinum. In the next step, a transition metal precursor is added and reduced to the metal. The transition metal preferably is iron, cobalt, nickel, copper, or manganese. Then, the particles are heated to form a platinum alloy on a conductive support. Finally, the particles are treated with an acid, e.g. aqueous sulfuric acid, to remove an unalloyed portion of the transition metal.

In summary, the electrocatalyst presently state of the art are not sufficient to meet the performance and cost requirements required for the widespread commercial introduction of fuel cell technology.

It is one objective of the present invention to provide electrocatalysts having an increased area of exposed catalytic surface area compared to typical core-shell catalysts with solid cores.

It is a further objective to provide a method for the preparation of such catalyst materials having an increased area of exposed catalytic surface area. The method should be based on a simple and economic synthesis route; it should be environmentally safe and should be easily scaleable for industrial production.

BRIEF DESCRIPTION OF THE FIGURES

FIG. 5A shows a TEM image of hollow shell particles after treatment in 0.5 M perchloric acid.

FIG. 5B shows the XRD of the hollow shell particles after treatment in 0.5 M perchloric acid FIG. 6 shows an XRD profile of the acid treated sample (Example 1).

DETAILED DESCRIPTION OF THE INVENTION

Figure 1:
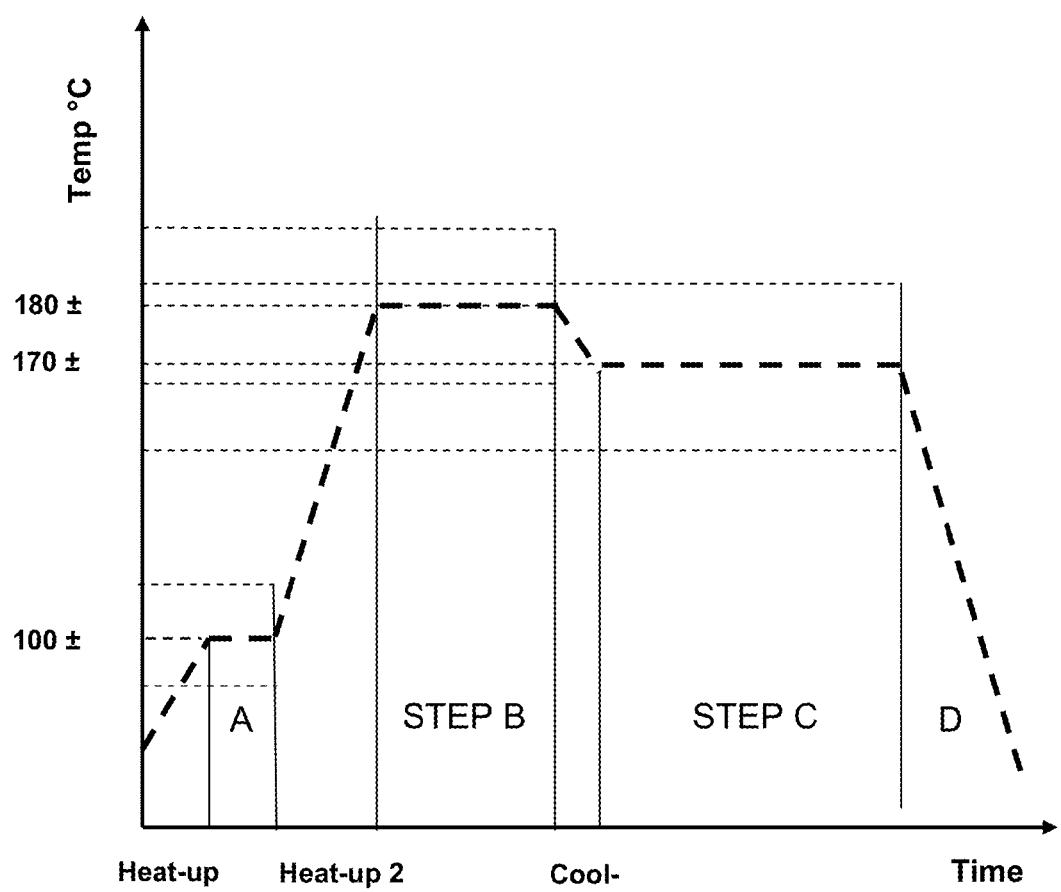
FIG. 1 provides a schematic drawing of the temperature profile employed in the present invention.

Generally, the challenge to prepare atomic layers and thin, continuous films of precious metals on base metal surfaces is to overcome the inherent tendency of precious metals, in particular platinum, to form agglomerates upon deposition by chemical reduction. Agglomerates may be deposited on the surface of a base metal particle; however, such surfaces are not dense and continuous. Thus, in the case of conventionally prepared core/shell catalyst particles, during electrochemical operation, the base metal cores of the catalyst particles may be exposed to the acidic electrolyte of a fuel cell, which then leads to leaching and dissolution of the particle cores. Moreover, such core/shell particles lack the high activity required for automotive fuel cell applications because precious metal agglomeration leads to a significant decrease of the catalytic activity.

This invention tries to provide a solution to this challenge. By employing the method of the present invention, it is possible to obtain base metal-precious metal alloy particles having a hollow core and a multilayered shell exhibiting pure precious metal on both sides of the shell.

In a first aspect, the present invention is directed to catalyst particles comprising a hollow multilayered base metal-precious metal core/shell structure according to the general formula (1)

$$H_{core}/PM_{inner\ shell}/IL/PM_{outer\ shell} \qquad (1)$$

in which $H_{core}$ is the hollow core of the particle, $PM_{inner\ shell}$ is a precious metal forming the innermost layer of the shell adjacent to the hollow core, $PM_{outer\ shell}$ is a precious metal forming the outmost layer of the shell, IL is an intermediate layer between $PM_{inner\ shell}$ and $PM_{outer\ shell}$ comprising a base metal/precious metal alloy, and wherein the atomic ratio of the base metal (BM) versus precious metal (PM) in the base metal/precious metal alloy in said intermediate layer decreases towards $PM_{outer\ shell}$ and $PM_{inner\ shell}$, and wherein the multilayered structure comprising of $PM_{inner\ shell}$, IL and $PM_{outer\ shell}$ is discontinuous.

Generally, the base metal (BM) is selected from the group of cobalt (Co), nickel (Ni), copper (Cu) and mixtures and combinations thereof. Preferably the base metal (BM) is nickel (Ni).

The precious metal in the outer shell ($PM_{outer\ shell}$) and the inner shell ($PM_{inner\ shell}$) is selected from the group consisting of platinum (Pt), palladium (Pd), iridium (Ir) and mixtures, alloys and combinations thereof. Preferably, the outer shell and the inner shell are comprising platinum (Pt), a platinum/palladium alloy (PtPd) or a platinum/iridium alloy (PtIr). In general, the multilayered structure comprising of $PM_{inner\ shell}$, IL and $PM_{outer\ shell}$ of the present invention is substantially discontinuous and comprises at least one (1) atomic layer of precious metal in both the outer ($PM_{outer\ shell}$) and inner precious metal shell ($PM_{inner\ shell}$). By the term "discontinuous" it is meant that every single metal layer as well as the multilayered structure as a whole comprises multiple adjacent islands of the respective metal or metal alloy.

The intermediate layer (IL) between the inner and the outer precious metal shells typically comprises at least 3 atomic layers of base metal/precious metal alloy. The base metal in this intermediate layer exhibits a concentration gradient towards $PM_{outer\ shell}$ and $PM_{inner\ shell}$. With the term "concentration gradient towards $PM_{outer\ shell}$ and $PM_{inner\ shell}$" it is meant that the atomic ratio of the base metal (BM) versus precious metal (PM) in the base metal/precious metal alloy in said intermediate layer decreases towards $PM_{outer\ shell}$ and $PM_{inner\ shell}$. In a preferred embodiment, the overall stoichiometry of the IL is about PM:BM=3:1. In the present application, the term "stoichiometry" means the atomic ratio of the elements.

Preferably the multilayered structure comprising of $PM_{inner\ shell}$, IL and $PM_{outer\ shell}$ is grown epitaxially onto a base metal core.

In one embodiment of the present invention, the hollow particles of the present invention may be manufactured by forming a base metal core in the first step, co-depositing a precious metal/base metal alloy shell onto said core in the second step, and a precious metal external shell in a third step thus obtaining core/shell type particles having a base metal core and an intermediate layer comprising of a base metal/precious metal alloy, and an outer shell essentially comprising of the precious metal. These particles are hereinafter referred to as core-shell-shell particles. In the last step of this method, the base metal core is dissolved, thereby obtaining hollow particles exhibiting the multilayered structure with an inner and an outer precious metal shell and a base metal-precious metal alloy in the intermediate layer. The method will be explained in more detail below.

In a second embodiment of the present invention, the hollow particles of the present invention may be manufactured by forming a base metal core in the first step and co-depositing a precious metal/base metal alloy shell onto said core in the second step, thus obtaining core/shell type particles having a base metal core and an outer shell layer comprising of a base metal/precious metal alloy. These particles do not feature another shell which comprises of a precious metal and surrounds the base metal/precious metal shell. Hereinafter, the particles of this second embodiment are referred to as core-shell particles. The dissolution of the base metal core of said core-shell particles is carried out in the same manner as for the core-shell-shell particles.

Dissolution of the base metal core inevitably leads to hollow multilayered base metal-precious metal core/shell particles having a hollow core, a precious metal inner shell, an intermediate layer comprising a base metal/precious metal alloy, and a precious metal outer shell according to claim 1; no matter whether the base core of a core-shell particle or a core-shell-shell particle is dissolved.

For best results, it was found that the base metal core particles must be generated at temperatures below 200° C., preferably in the range of 165 to 195° C., i.e. 180±15° C., during about 2 to 6 hours. Subsequently, the temperature is adjusted to 170±20° C. which is the temperature range suitable for the precious metal deposition. Once the desired temperature for the precious metal deposition is reached, the precious metal precursor is added continuously during about 10 to 20 hours. In a preferred embodiment, the base metal precursor is added first to the solvent while the precious metal precursor is added to the reaction mixture only after part of the base metal precursor was reduced. Suitable solvents are, for instance, polyols which are described in more detail below.

The chemical principle of the formation of core-shell and core-shell-shell particles is as follows: the formation of base metal core particles takes place by reducing a base metal precursor to the respective elementary base metal. This formation of base metal cores takes place for several hours. Then, the addition of the precious metal precursor begins, but there is still unreduced base metal precursor present. After the beginning of the addition of the precious metal precursor, the base metal and the precious metal are reduced and deposited onto the base metal core concomitantly in the form of a base metal-noble metal alloy. It has to be noted that the base metal precursor is only added once, namely before the formation of the base metal cores, whereas the precious metal precursor is added continuously from the start of its addition until the end of the entire particle formation process. Therefore, as the precipitation progresses, the concentration of unreduced base metal in the solution decreases, whereas the concentration of the precious metal precursor remains constant. As a consequence, the concentration of the base metal in the alloy shell surrounding the core decreases towards the periphery of said alloy shell.

If there is reducible base metal precursor present in the reaction mixture until the end of the entire particle formation, the manufacturing process will yield core-shell particles as described above.

If, on the other hand, the base metal precursor is fully reduced before the addition of the precious metal precursor is finished, the manufacturing process will yield core-shell-shell particles as described above, wherein the outer shell essentially consists of pure precious metal.

If the reduction reaction of the base metal precursor is carried out at temperatures below 200° C., preferably at 180±15° C. as described above for the present invention, the base metal precursor will be reduced only slowly. Starting to add a precious metal precursor after reducing the base metal precursor for 2 to 6 hours at a temperature of 180±15° C. means that the concentration of the unreduced base metal precursor in the solution is still quite high. Concomitant deposition of base metal and precious metal leads to the formation of an alloy surrounding the base metal core, wherein the base metal exhibits the concentration gradient as mentioned above. Preferably, the addition of the precious metal precursor takes place for 10 to 20 hours at a temperature of 170±20° C.

Depending on the periods and temperatures chosen for the formation of the base metal core and for the addition of the precious metal precursor, respectively, and also depending on the amount of reducible base metal precursor present in the reaction mixture at the end of the entire particle formation, the manufacturing process according to the present invention may yield a) core-shell particles having a base metal core and a base metal-precious metal alloy outer shell, or b) core-shell-shell particles having a base metal core, a base metal-precious metal alloy intermediate layer and a thin outer shell consisting predominantly of the precious metal.

Core-shell-shell particles according to the present invention feature an outer shell which predominantly consists of the precious metal, but may also include base metal atoms. Preferably, the outer shell of these particles features a precious metal:base metal atomic ratio of about 1:1 to 10:1.

If, by contrast, the core particles are formed by reducing a base metal precursor at temperatures of about 220±20° C., the reduction of the base metal is significantly more rapid. Therefore, if all other process parameters remain essentially the same as described above, there is less base metal precursor present in comparison to the above-described invention when the addition of the precious metal precursor starts. As a consequence, the intermediate base metal-precious metal alloy of the particles thus obtainable comprises a higher atomic ratio of noble metal, and the outer layer essentially consists of the precious metal and is a substantially continuous layer. The base metal core of this type of core-shell-shell particles is protected from dissolution in acid treatment. Thus, such core-shell-shell particles are stable in acidic leaching and show only very low dissolution of the base metal core. Such core-shell-shell particles are not the object of the present invention.

The core-shell and the core-shell-shell particles according to the present invention feature a good solubility of the base metal (e.g. nickel) in a subsequent leaching step. Generally, treatment of said particles having a base metal core in acidic solutions yields hollow particles exhibiting pure precious metal inner and outer shells and intermediate base metal-precious metal alloy layers between said shells. The base metal within the intermediate layer exhibits a concentration gradient towards the outer and inner precious metal shell which means that the closer an atomic layer is located to the outer or the inner shell, the more its base metal content decreases. The dissolution of base metals by acids is also known as "acidic leaching".

The core-shell and the core-shell-shell particles according to the present invention feature a precious metal:base metal atomic ratio in the outer shell of about 1:1 to 10:1. "Outer shell" means the base metal-precious metal alloy in case of core-shell particles or the outer shell consisting predominantly of precious metal in case of core-shell-shell particles. When the base metal is leached out from the outer shell, it produces defects in the form of holes, i.e. empty atom positions, which can move and diffuse towards the inner part of the shell. This leads to the transport of the base metal from the core to the surface of the particle. In addition, a second mechanism can lead to openings in the shell when some of the defects formed start to cluster, thereby resulting in larger holes (i.e. several atoms size) across the entire shell. Such openings permit the access of the oxidizing acids to the core and their eventual dissolution.

It has to be stressed out that both types of particles, i.e. core-shell as well as core-shell-shell particles, lead to identical hollow particles.

Basically, the medium particle size, i.e. the diameter of the hollow base metal-Pt/Pt alloy particles is in the range of 10 to 200 nm; preferably in the range of 15 to 150 nm.

In a preferred embodiment, the entire hollow shell comprising the inner precious metal shell, the intermediate layer, and the outer precious metal shell has a thickness in the range of 0.7 to 5 nm, more preferably in the range of 0.7 to 3.2 nm.

The hollow multilayered base metal-precious metal catalyst particles of the present invention reveal a high specific activity. As an advantage, they provide low precious metal contents in fuel cell electrodes due to the hollow core/shell particle structure in which the catalytically active Pt is present at the outer and the inner surface of the catalyst particles.

In a second aspect, the invention is directed to a method of preparation of catalyst particles comprising a layered hollow core/shell/shell structure, comprising the steps a) heating a base metal precursor compound in a polyol solvent system at a temperature in the range of 80 to 120° C., b) heating the reaction mixture at a temperature in the range of 165 to 195° C. (180±15° C.) for 2 to 6 hours to form base metal core particles ($BM_{core}$), c) adding a precious metal precursor compound to the reaction mixture at a temperature in the range of 150 to 190° C. (170±20° C.) for 10 to 20 hours, d) cooling down the reaction mixture and isolating the particles.

e) treating the particles in an oxidizing acid, f) isolating and purifying the particles.

Generally, the base metal precursor compound is selected from the group of cobalt (Co), nickel (Ni) or copper (Cu) compounds and mixtures and combinations thereof. Preferably the base metal precursor is a nickel (Ni) compound. More preferably, the base metal precursor is nickel acetate ($Ni(CH_3COO)_2$) or nickel carbonate ($NiCO_3$) or a mixture thereof. Most preferably, the base metal precursor is nickel carbonate.

The precious metal precursor compound is selected from the group consisting of platinum (Pt), palladium (Pd) or iridium (Ir) compounds and mixtures and combinations thereof. Preferably, the precious metal precursor compound is a platinum (Pt) compound.

The method may further comprise the addition of Pt- or Ir-seed compounds in step a) in order to prepare the base metal core material as described in WO2012/123442A1.

The precious metal precursor compound added in step c) may further comprise additional precursor compounds of the precious metals Ir and/or Pd.

Typically, before step a), the reaction mixture is heated to a temperature in the range of 80 to 120° C. at a heating rate of 0.5 to 1° C./min (heat-up 1).

Between step a) and step b), the reaction mixture is heated to a temperature in the range of 165 to 195° C., i.e. 180±15° C., at a heating rate of 3 to 6° C./min (heat-up 2).

In order to reach the temperature regime of step c), the reaction mixture is adjusted after step b) from the temperature of the base metal core formation (180±15° C.) to the temperature suitable for the precious metal deposition (170±20° C.).

As the temperature ranges for the base metal core formation and the precious metal deposition, respectively, overlap over a wide range, the term "adjusting" can mean
- cooling down the reaction mixture after step b) if the formation of the base metal core shall take place at a higher temperature than the deposition of the precious metal, or
- heating up the reaction mixture after step b) if the formation of the base metal core shall take place at a lower temperature than the deposition of the precious metal, or
- not changing the temperature of the reaction mixture after step b) at all if the formation of the base metal core shall take place at the same temperature as the deposition of the precious metal.

In step c), the precious metal precursor compound is slowly added to obtain a gradient growth of the intermediate layer (IL). Preferably, the precious metal precursor compound is added in an addition rate of <1 mg PM/min per 100 ml of reaction mixture. Optionally, ultrasonic energy can be applied during the addition of the precious metal precursor.

In a further aspect, the method of the present invention is based on the use of certain platinum precursor compounds, in particular low halide containing platinum precursor compounds, wherein platinum is present in the oxidation state +II. Suitable platinum(II) precursor compounds are commercially available as low halide, in particular low chloride containing Pt(II) compounds. An example is platinum(II) tetraammine hydrogencarbonate [Pt(NH$_3$)$_4$(HCO$_3$)$_2$].

Particularly suitable Pt(II) precursor complexes have the general formula (2) or (3)

 (2)

 (3)

In these formula, the Pt(II)-complexes (2) and (3) show the coordination number 4 and the indexes have the following meaning:
L is a neutral monodentate donor ligand,
L-L is a neutral bidentate donor ligand,
a is an integer of 1 to 4 and
b is an integer of 0 to 3, with a+b=4,
c is 1 or 2
d is 0 or 2 ist, with 2c+d=4, and
X is a single or twice negatively charged anionic group and
m is 1 or 2.

Preferably L is a nitrogen-containing neutral ligand selected from the group of ammonia (NH$_3$) or ethanolamine (HO—C$_2$H$_4$—NH$_3$, "EA"), preferably L-L is ethylene diamine (H$_2$N—C$_2$H$_4$—NH$_2$, "en"). The anionic group X is preferably selected from the group of carbonate, acetate, sulfate, nitrate, oxalate (C$_2$O$_4{}^{2-}$) or hydroxyl (OH$^-$).

As an example, suitable Pt(II) precursors according to the general formula (a) or (b) are the following Pt(II) complexes, their aqueous compositions and mixtures and combinations thereof:
platinum(II)-tetraethanolannine carbonate Pt(EA)$_4$CO$_3$
platinum(II)-tetraethanolannine hydroxide Pt(EA)$_4$(OH)$_2$
platinum(II)-diethylenediamine carbonate Pt(en)$_2$CO$_3$
platinum(II)-tetraethanolannine oxalate Pt(EA)$_2$(C$_2$O$_4$).

These complexes are described, inter alia, in the pending EP patent application EP12196795.4 ("Process for preparation of low halide platinum(II) complexes") to the same applicant. They are available from Umicore AG & Co KG, D-63457 Hanau, Germany.

Further, similar suitable Pt(II) precursor compounds and their aqueous compositions are described in the pending EP patent application EP12196767.03 ("Method for manufacture of aqueous compositions of platinum metal group complexes") of the same applicant. These complexes are also available from Umicore AG & Co KG, D-63457 Hanau, Germany.

Suitable precursors compounds for Ir are Ir(III)- or Ir(IV)-compounds such as iridium(III) acetate [Ir(CH$_3$COO)$_3$], H$_2$Ir(OH)$_6$ or H$_2$IrCl$_6$, suitable precursor compounds for Pd are palladium (II) compound such as Pd(NO$_3$)$_2$ or PdSO$_4$. These compounds are commercially available from different vendors.

It was found that the Pt precursors, in order to be suitable for the method of the present invention, should be stable towards reduction up to a temperature >150° C. in the polyol system employed. In other words, the reduction to metallic platinum should only start at temperatures above 150° C. In the present application, this temperature is called "threshold reduction temperature". To the contrary, conventional precursors such as chloroplatinic acid (H$_2$PtCl$_6$) or Bis-(ethanolamine)-hexahydroxoplatinate(IV)-solution [(HO—C$_2$H$_4$—NH$_3$)]$_2$Pt(OH)$_6$ (also called "EA-platinum") readily react below 130° C. and cannot be used for the formation of the base metal-precious metal intermediate layer or the outer shell, respectively, of the present invention. However, EA-platinum and chloroplatinic acid may be used to generate Pt seeds in the preparation of nickel cores in step a).

A further aspect of the Pt-precursors suitable for the formation of the intermediate layer or the outer shell in the process of the present invention is their potential to be very slowly reduced, by which the classical cluster growth mechanism is prevented. A suitable Pt precursor is characterized by the oxidation state +II, which means the redox potential is low, whereby the reduction rate may be lower compared to Pt-precursors in +IV oxidation state. Secondly, it is well know in the field of chemistry that nitrogen containing ligands (like ammonia, ethylenediamine or ethanolamine) form stable Pt complexes, in contrast to e.g. H$_2$PtCl$_6$.

A schematic drawing of the temperature profile employed in the method of the present invention is shown in FIG. 1. The various steps of the method of the present invention are now described in more detail.

In step a), the base metal precursor compound is mixed with a polyol solvent system and heated up to a temperature in the range of 80 to 120° C., i.e. 100±20° C. In this system, the polyol is acting as solvent and as a reducing agent.

Suitable polyol solvents for use in the present method are ethylene glycol (EG), 1,2-propylene glycol (PG), 1,3 propylene glycol, diethylene glycol (DEG), dipropylene glycol (DPG), triethylene glycol (TEG), tetraethylene glycol, polyethylene glycol 200 (PEG 200) and/or mixtures thereof. Preferably, the boiling point of the polyol system employed should be above 200° C. As long as this condition is verified, small quantities of lower boiling solvents may be added. Furthermore, other organic dispersing agents or surfactants, such as, e.g., triethanolamine, sorbitol, gum arabic or pentaerythritol may be added.

In a preferred embodiment, the method may further comprise the addition of Pt- or Ir-seed compounds in step a) in order to prepare the base metal core particles as described in WO 2012/123442 A1. In case the seed formation method is employed, the reaction mixture is held at the temperature range of 80 to 120° C. for a period of about 10 to 60 min. The exact conditions depend on the particle size range needed for the core particles.

Suitable precursor compounds of the base metals should be soluble in the polyol solvent system. Examples are the nitrates, sulfates, carbonates, hydrogen-carbonates and acetates of Co, Ni and Cu. Examples are Cu(II)-carbonate, Ni(II)-carbonate, Co(II)-sulfate, Cu(II)-acetate Cu(II)-hydrogencarbonate or Co(II)-carbonate. Other precursor compounds, preferably chloride-free precursors may also be used. Further additives for control of basic or acidic environments and/or for buffering action may be added to the base metal precursor compounds (e.g. $Na_2CO_3$, $K_2CO_3$, $NH_4$ compounds etc). The concentration of the base metal in the polyol reaction mixture should be in the range of 0.5 to 20 g/L, preferably in the range of 1 to 10 g/L.

In step B) the reaction mixture is held at a temperature in the range of 180±15° C. to form the base metal core particles ($BM_{core}$). This temperature is held for a period of about 2 to 6 hours, preferably 3 to 5 hours, wherein the base metal particles are formed. The time period for heating the reaction mixture is typically in the range of 20-40 mins (depending on the batch size). For best results, the heating rate employed between step a) and step b) is in the range of 3-5° C./min (heat-up 2).

As mentioned, it was found that leachable core-shell and core-shell-shell particles are obtained when the base metal core particles are generated in the polyol system at temperatures below 200° C., preferably in the range of 165 to 195° C., i.e. 180±15° C., and preferably for 2 to 6 hours.

In order to reach the temperature regime of step c), the reaction mixture is adjusted after step b) from the temperature of the base metal core formation (180±15° C.) to the temperature suitable for PM deposition (170±20° C.). In this temperature range should be the threshold reduction temperature of the precious metal precursor employed. Suitable adjusting rates from step b) to step c)—in case the temperatures of both steps are not identical—are in the range of 0.1 to 5° C./min. Preferably, they are in the range of about 0.5-1° C./min. Once the required temperature range is reached, the precious metal precursor compound is added.

In step c), the precious metal precursor compound is slowly added to obtain a composition gradient in the intermediate layer (IL). Preferably, the precious metal precursor compound is added in an addition rate of <1 mg PM/min per 100 ml of reaction mixture. In the case of a Pt precursor compound, the addition rate is typically <1 mg Pt/min for reaction mixtures of 100 ml volume. For bigger reaction volumes or scale-up batches, the addition rate of the precious metal precursor compounds has to be adjusted accordingly. By this measure, a gradient in the base metal concentration of the IL of the resulting particles is achieved and the composition $(BM)_x(PM)_y$ (with x+y=1 and x=0.99 to 0.01 and y=0.01 to 0.99) is obtained.

Figure 2:
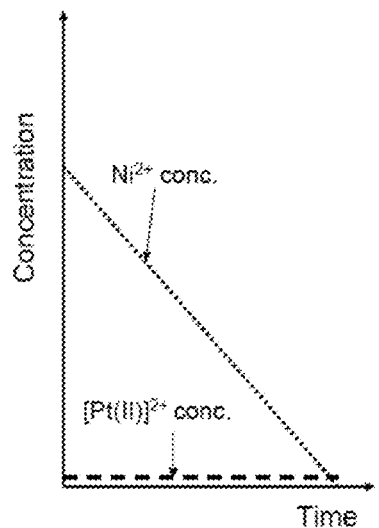
FIG. 2 schematically depicts the changes of the $Ni^{2+}$ and $Pt^{2+}$ concentration in the reaction mixture during the NiPt intermediate layer (IL) and Pt shell formation in step C) of the present invention.

As an example, FIG. 2 schematically depicts the changes of the $Ni^{2+}$ and $Pt^{2+}$ concentrations in the reaction mixture during the NiPt (IL) and Pt shell formation in step c) of the present invention. As the Pt-precursor is slowly added and reduced, the concentration of the $Pt^{2+}$ ions remains constant. To the contrary, the concentration of $Ni^{2+}$ ions in the reaction mixture is reduced as no additional Ni-precursor is added.

In step c) the reaction mixture is maintained at a temperature in the range of 150 to 190° C. (170±20° C.) for a period of about 10 to 20 hours.

In step d) the reaction mixture is cooled down and the particles are isolated by methods well known to the skilled person. The resulting core/shell metal particles may be separated from the reaction mixture by conventional separation steps (filtration, centrifugation, decantation etc). Further treatment steps, known to the person skilled in the art, may be added (e.g. washing, drying, screening etc.).

Figure 3A:
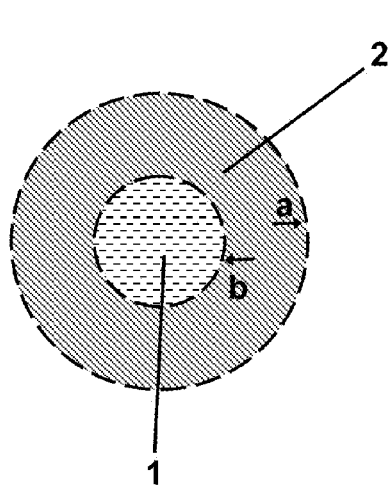
FIG. 3a) schematically depicts a core-shell particle obtained after step d) of the present invention.

FIG. 3a) schematically depicts a core-shell-particle obtained after step d). The inner base metal core (1) is surrounded by the intermediate layer (IL) (2) comprising a base metal/precious metal alloy. The discontinuous lines between the core and the IL shall schematically indicate that both the core and the IL are leachable, i.e. accessible for acids. The arrow (a) indicates the base metal gradient within the intermediate layer, i.e. the base metal ratio within the base metal/precious metal alloy decreases towards the outer shell. Similarly, the arrow (b) represents the precious metal gradient whose ratio within said alloy decreases towards the base metal core.

Figure 3B:
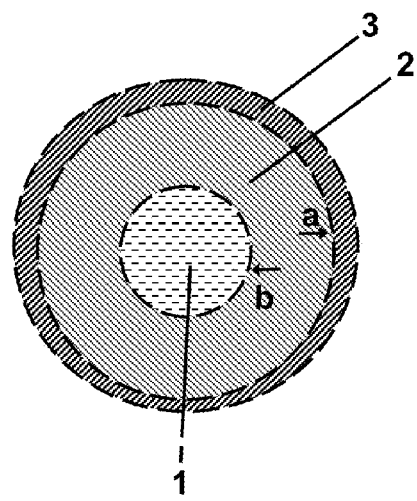
FIG. 3b) schematically depicts a core-shell particle obtained after step d) of the present invention.

FIG. 3b) schematically depicts a core-shell-shell particle obtained after step d). The inner base metal core (1) is surrounded by the intermediate layer (IL) (2) comprising a base metal/precious metal alloy, and the IL is surrounded by a precious metal outer shell (3). The discontinuous lines between the core and the IL, the IL and the outer shell and around the outer shell, respectively, shall schematically indicate that the core, the IL and the outer shell are leachable, i.e. accessible for acids. The arrow (a) indicates the base metal gradient within the intermediate layer, i.e. the base metal ratio within the base metal/precious metal alloy decreases towards the outer shell. Similarly, the arrow (b) represents the precious metal gradient whose ratio within said alloy decreases towards the base metal core.

In step e), the core/shell/shell particles of step d) are treated in an oxidizing acid, i.e. leached. Preferably, the oxidizing acid is selected from the group consisting of perchloric acid, nitric acid, sulfuric acid, phosphoric acid, acetic acid, and formic acid. Preferably, a 0.1 to 2.0 M aqueous solution of said oxidizing acid is used. Leaching time preferably is between 1 h and 48 h. Furthermore, it is preferable to carry out leaching at a temperature of between 15° C. and 90° C. In a preferred embodiment, leaching is done by treating the particles of step d) in a 0.5 M aqueous $HClO_4$ solution at room temperature for 24 h. In another preferred embodiment, leaching is carried out for 16 hours at 65° C. in a 0.5 to 1.0 M aqueous solution of $H_2SO_4$ or $HNO_3$.

Finally, in step f) the leached particles are isolated and purified. The isolation of the particles from the acidic solution may, for instance, be carried out by filtering them off. In a preferred embodiment, the particles are purified after having isolated them by repeatedly washing them with water, sonicating and centrifuging them until the supernatant becomes clear and transparent. Optionally, this procedure is followed by another one to two washing/sonicating/centrifuging procedures with acetone instead of water. The particles may optionally be dried after the purification, preferably under vacuum and in an oxygen-free environment. It is well-known by skilled persons that an oxygen-free environment can be provided by using an inert gas atmosphere, suitable inert gases being, for instance, helium, argon, neon, krypton, xenon, nitrogen, and mixtures thereof. The skilled person may make use of such inert gases without going beyond the scope of protection of the present invention. The pressure during vacuum drying is preferably ≤100 mbar and most preferably ≤50 mbar.

Figure 4:
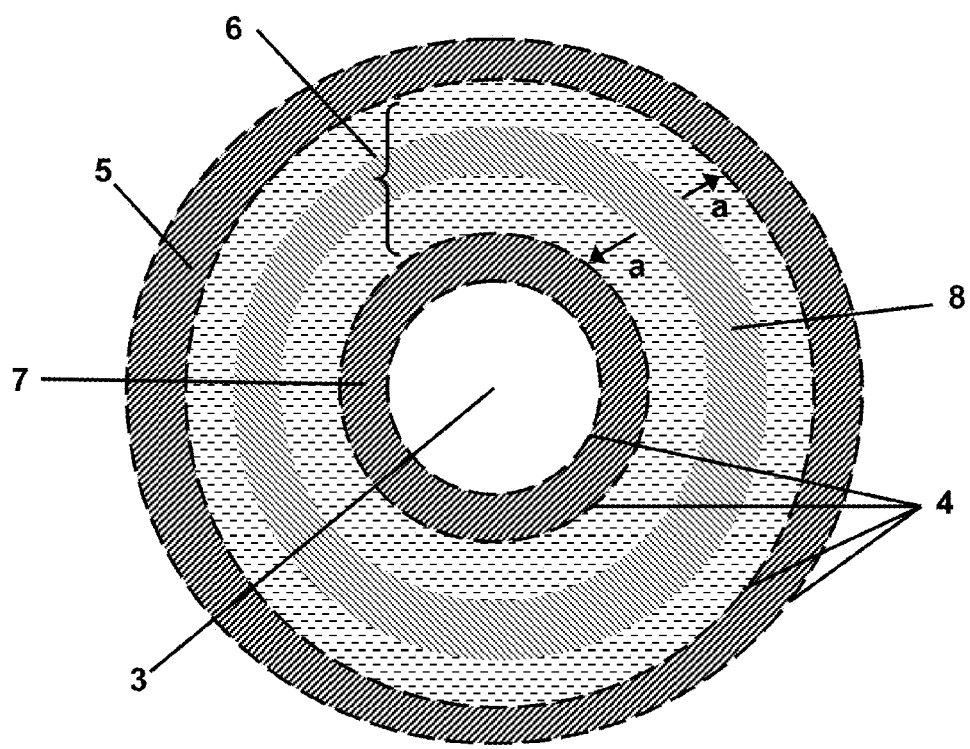
FIG. 4 schematically depicts the hollow particles obtained after acidic leaching of the base metal core.

The hollow particles obtained after leaching are schematically depicted in FIG. 4. The hollow core $H_{core}$ (3) of the particle is surrounded by a precious metal forming the innermost layer of the shell ($PM_{inner\ shell}$) (7), followed by an intermediate layer (IL)(6) between $PM_{inner\ shell}$ and $PM_{outer\ shell}$. $PM_{outer\ shell}$ (5) is a precious metal forming the outmost layer of the shell. The hatched circle (8) represents the layer within said IL which comprises the highest base metal ratio of the base metal/precious metal alloy within the intermediate layer (6). The arrow (a) shows the base metal gradient within the intermediate layer: after leaching, the base metal ratio within the base metal/precious metal alloy has decreased towards the outer and the inner precious metal shell.

Advantageously, the process is carried out under a protective gas atmosphere, for example under argon (Ar) or nitrogen ($N_2$). A reducing atmosphere (such as forming gas) may also be used. This measure avoids oxidation of the base metal particles and prevents rapid deterioration of the polyol solvents.

The resulting hollow multilayered base metal-precious metal core/shell particles may contain the base metals cobalt, nickel or copper (or mixtures or alloys thereof) and the shell may comprise preferably platinum (Pt), iridium (Ir) or palladium (Pd) and mixtures or combinations thereof. Preferably, the total concentration of Ir or Pd in the outer Pt containing shell is in the range of 1 to 10 atomic percent (based on platinum metal).

The process of the present invention provides nano-sized hollow particles. Generally, the medium diameter is in the range of 10 to 200 nm, preferably in the range of 15 to 150 nm and particularly preferred in the range of 15 to 100 nm. Advantageously, the particles reveal a uniform shape, a narrow size distribution and, in most cases, high crystallinity. Furthermore, the particles contain very low levels of polymer residues or organic contaminants on their surface.

In a preferred embodiment, the catalyst particles according to the present invention are supported on a support material. Such supported catalyst particles are hereinafter referred to as "catalyst compositions". These catalyst compositions comprising supported catalyst particles are useful for electrochemical applications. Preferably, the support material is selected from the group consisting of graphites, conductive carbon blacks, graphitized carbon blacks, conductive polymer materials, conductive ceramic materials and mixtures and combinations thereof.

Supported hollow catalyst particles can be prepared by first preparing the hollow particles as described above and then depositing them onto the support material. Alternatively, the base metal core particles may be prepared in a supported stage in the first step, then the precious metal precursor is added in the second step to form core-shell or core-shell-shell particles and lastly, the particles are leached as described above.

In a further alternative, the core particles are prepared in the first step and then simultaneously the precious metal precursor is depleted and the particles supported onto a support material in the second step. In this preferred method, the outer particle shell is applied to the metal of the base metal core in the presence of said support material.

The catalyst particles and the catalyst compositions according to the present invention find use in various catalytic applications, for example in gas-phase catalysis, in electrocatalysts for fuel cells or in catalytic converters for automobiles. The particles may also be useful in variety of other applications such as, e.g., in electronic or medical applications.

The invention is now explained in more detail by the following examples, which are to be considered illustrative, but not intended to limit the scope of the invention and the following claims.

General Experimental Remarks

Particle Analysis:

The resulting particles are inspected by Transmission and Scanning electron microscopes (TEM JEM-2010 and FESEM JEOL-7400). The medium particle size (particle diameter) is reported. Crystal structure of the particles is determined by electrodiffraction (JEM-2010) and by X-ray diffraction (XRD Bruker-AXS D8 Focus).

Elemental Analysis:

Elemental analysis is performed by inductive coupled plasma analysis (ICP) using solutions obtained by chemical digestion of the materials. The differences between the calculated values and the amounts determined by ICP may result from the lack of appropriate digestion/dissolution methods.

Reaction Conditions/Equipment:

Reactions are performed in clean glassware under argon or nitrogen protective atmosphere. High purity polyol solvents are employed. Typically a 0.5 L or 1 L round glass reactor with a distiller, heating mantle and temperature control unit is used. Continuous mixing is done at 350-400 RPM.

EXAMPLES

Example 1

Preparation of Ni Core Particles 1. 2.22 g of nickel carbonate and 0.1 g of sorbitol were mixed in 150 ml of polyols (1:1 PD/DEG) for 30 minutes at 80° C.
   One drop of di(ethanolammonium)-hexahydroxoplatinum(IV) solution; [$(EA-H^+)_2Pt^{IV}(OH)_6$ solution], Umicore AG & CO KG, Hanau, Germany; ca. 0.03 g Pt); were added to the polyol and the heater was programmed to first reach 115° C. at 0.5° C./min rate (segment A, FIG. 1) where it was maintained for 30 min (segment B). Next, the temperature was raised to 180° C. at 4° C./min.
2. The system was maintained at 180° C. for 5 hours.
3. Optionally, an additional 0.9 g sorbitol was added prior the delivery of the Pt/DEG solution.

Formation of Pt shell:

1. 9.94 g (=1 g Pt) of a water-based solution of the precursor platinum(II)-tetraethanolamine-carbonate ($[Pt(EA)_4]CO_3$; 10.06 wt-% Pt; Umicore AG & Co KG, Hanau, Germany) was diluted in 250 ml of DEG.
2. This solution was added at 0.25 ml/min over 17 h starting after the formation of Ni cores (segment C, FIG. 1).
3. Optionally, during the addition of Pt 10-20 ultrasonic bursts lasting 1.5 sec each were applied.
4. Final particles were repeatedly washed, dried, and analyzed. These routines should be familiar to the skilled worker.

Acid Treatment of the Core-Shell-Shell (CSS) Particles in Perchloric Acid

The washed core-shell-shell particle powder was kept in 0.5 M perchloric acid for up to 48 hours. Afterwards, the particles were filtered off, repeatedly washed with water, sonicated and centrifuged until the supernatant became clear and transparent. Subsequently, the particles were washed, sonicated and centrifuged twice with acetone under an argon atmosphere. At last, the particles were dried in a vacuum oven for 12 hours at 80° C. at a pressure of ≤50 mbar.

Resulting particles are shown in FIG. 5A and their XRD is shown in FIG. 5B.

FIG. 5a TEM shows hollow shell particles after treatment in 0.5 M perchloric acid FIG. 5b shows the XRD of the hollow shell particles after treatment in 0.5 M perchloric acid.

FIG. 6 shows an XRD profile of the acid treated sample. The vertical arrows indicate peak positions where Ni reflections are expected if the core would have been preserved from dissolution. This plot shows that only a Pt-rich NiPt alloy phase is present.

Figure 7:
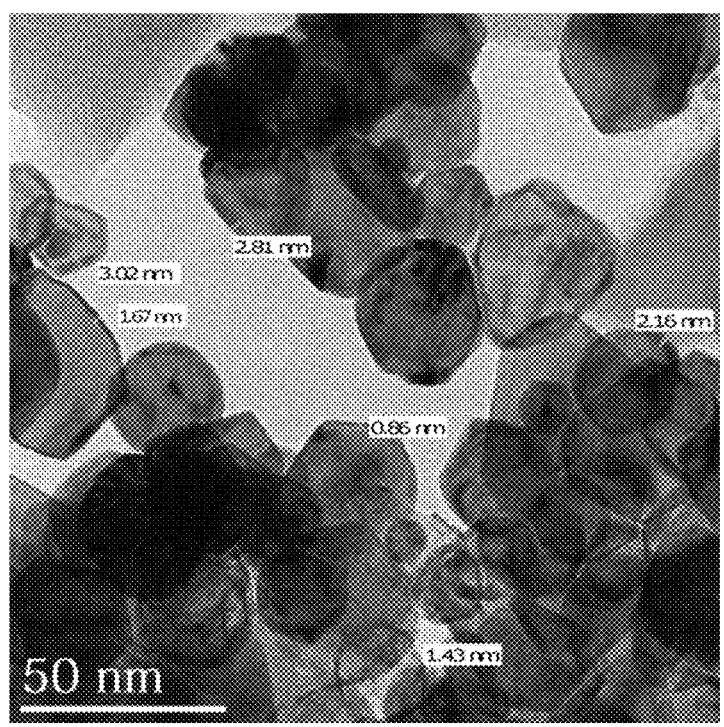
FIG. 7 shows a TEM image of the hollow spheres wherein the thickness of some shells is indicated.

FIG. 7 shows a TEM of the hollow spheres wherein the thickness of some shells is indicated.

Acid Leaching of Core-Shell-Shell Particles in Sulfuric Acid 1 g of the core-shell-shell sample was placed in 100 ml 0.5 M $H_2SO_4$ in a glass flask and heated for 16 hours at 65° C. The residual powder was filtered off, washed with distilled water and dried in a vacuum oven for 12 hours at 80° C. at a pressure of ≤50 mbar.

Acid Leaching of Core-Shell-Shell Particles in Nitric Acid 1 g of the core-shell-shell sample was placed in 100 ml 1 M $HNO_3$ in a glass flask and heated for 16 hours at 65° C. The residual powder was filtered off, washed with distilled water and dried in an vacuum oven for 12 hours at 80° C. at a pressure of ≤50 mbar.

Acid leaching with either 0.5M $H_2SO_4$ or 1.0 M $HNO_3$, respectively, lead to identical products.

Figure 8A:
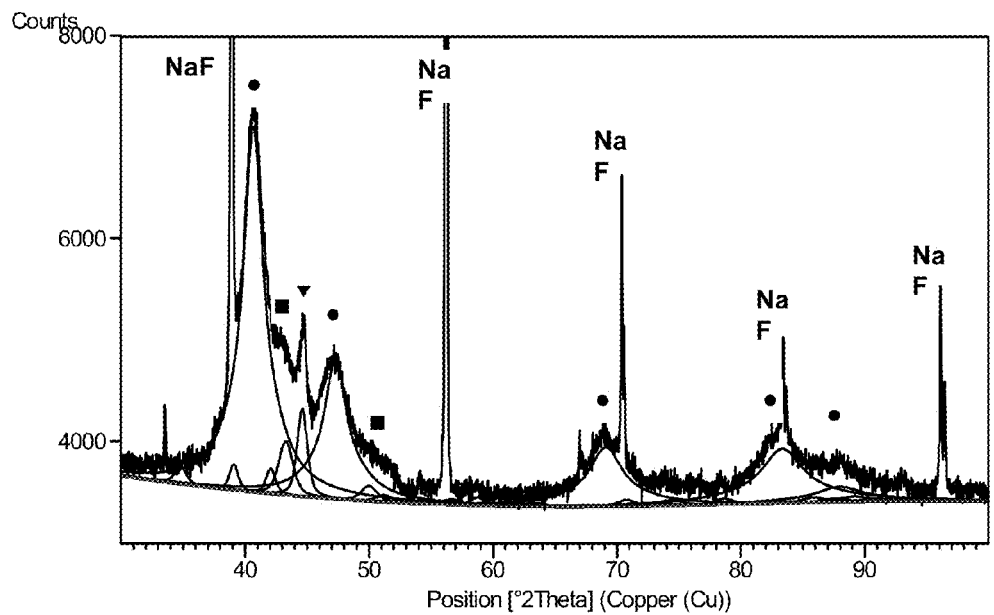
FIG. 8a) shows an XRD pattern of an as-prepared PtNi core-shell-shell sample with a Pt-rich $Pt_xNi$ phase, a Ni-rich $Pt_xNi$ phase, and a pure hexagonal Ni phase.

FIG. 8a shows an XRD pattern of an as-prepared PtNi core-shell-shell sample with a Pt-rich $Pt_xNi$ phase (●), a Ni-rich $Pt_xNi$ phase (■), and a pure hexagonal Ni phase. Leaching was carried out with 0.5 M $H_2SO_4$.

Figure 8B:
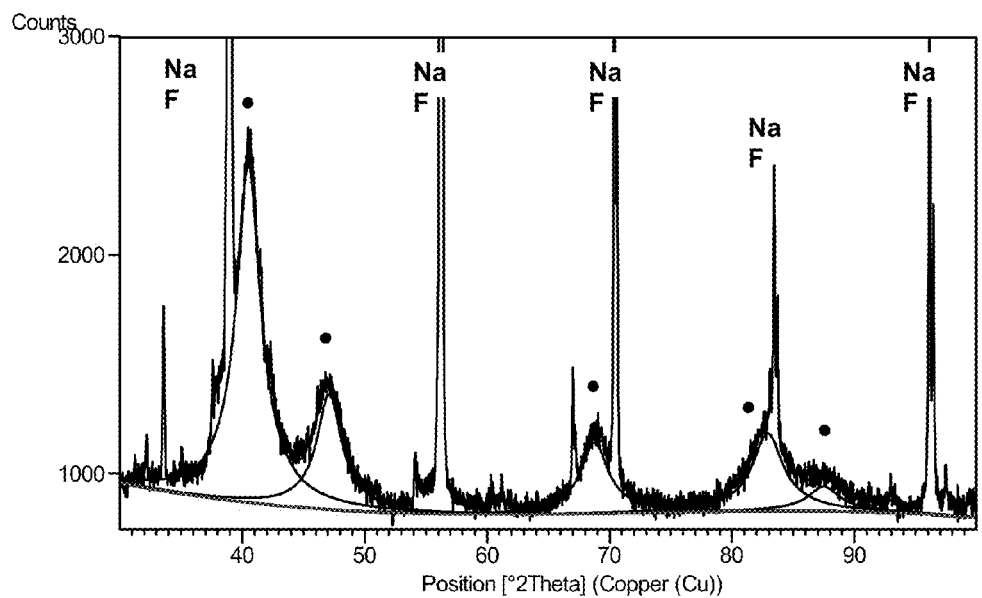
FIG. 8b) shows an XRD pattern of an acid leached PtNi core-shell-shell sample showing only XRD lines from the $Pt_xNi$ phase.

FIG. 8b shows an XRD pattern of an acid leached PtNi core-shell-shell sample showing only XRD lines from the $Pt_xNi$ phase. Leaching was carried out with 0.5 M $H_2SO_4$.

The narrow XRD lines in both XRD patterns are caused by the internal standard (NaF) used for high precision position determination.

Electrochemical Testing

For electrochemical testing of the catalyst particles of the present invention, the standard rotating disc electrode (RDE) measurement is conducted using a potentiostatic device (Radiometer Voltalab, PGZ 100). Details of the measurement are given in the following section. About 5-10 μg of the catalyst particles are applied to a glassy carbon electrode with 0.2 $cm^2$ surface area. The sample is placed in the electrolyte (0.1 M perchloric acid) and flushed with pure argon at room temperature (20° C.).

After conditioning (30-40 cycles), the potential (in V) is scanned for a total of 3 cycles in a range from 0 to +/−1.1 V vs. an $Hg/Hg_2SO_4$ reference electrode at a scan speed of 20 mV/s. On the y-axis, the current density (in mA/$cm^2$) is recorded. The area of the $H_2$-adsorption peak is integrated and the ECA ($m^2$/g) is determined.

For the measurement of the mass activity in the oxygen reduction reaction (ORR) the electrolyte is subsequently saturated with pure (6.0) oxygen gas for 20 min. The RDE is rotated at 1.600 rpm. After conditioning, the potential (in V) is scanned in a total of 2 cycles a range from 0 to +/−1.1 V. The current density is recorded at a value of 0.95 V and the mass activity is calculated.

The core/shell catalyst sample is prepared as described above in Example 1, leaching is conducted for 16 h at 65° C. in 1 M $HNO_3$. A Umicore standard electrocatalyst comprising 20 wt.-% Pt on graphitized carbon black (Type Pt-915, available from Umicore AG & Co KG, Hanau, Germany) is used as a reference material. Results are shown in Table 1.

As can be seen from Table 1, the hollow core-shell particles of the present invention show improved electrochemical activity in comparison to a standard carbon-supported Pt catalyst. The value of mass activity of 157 mA/mgPt exceeds the value measured with a 20 wt.-% Pt/C electrocatalyst nearly by the factor of 3. Taken in account the lower ECA of the catalyst particles of the present invention, the specific activity is by the factor of 4.8 higher compared to a reference Pt/C electrocatalyst.

These results underline the high catalytic activity of the hollow core-shell particles of the present invention.

TABLE 1

| Catalyst type | Mass activity at 0.95 V [mA/mgPt] | Specific activity at 0.95 V [μA/$cm^2$Pt] | ECA [$m^2$/gPt] |
|---|---|---|---|
| Hollow core NiPt/Pt (Example 1) | 157 | 684 | 23 |
| Reference catalyst (Umicore Pt-915) | 55 | 140 | 39 |

As can be seen from Table 1, the hollow core-shell particles of the present invention show improved electrochemical activity in comparison to a standard carbon-supported Pt catalyst. The value of mass activity of 157 mA/mgPt exceeds the value measured with a 20 wt.-% Pt/C electrocatalyst nearly by the factor of 3. Taken in account the lower ECA of the catalyst particles of the present invention, the specific activity is by the factor of 4.8 higher compared to a reference Pt/C electrocatalyst.

These results underline the high catalytic activity of the hollow core-shell particles of the present invention.

What is claimed is:

1. Catalyst particles comprising a hollow multilayered base metal-precious metal core/shell structure according to the general formula $$H_{core}/PM_{inner\ shell}/IL/PM_{outer\ shell}$$

in which
   $H_{core}$ is the hollow core of the particle,
   $PM_{inner\ shell}$ is a precious metal forming the innermost layer of the shell adjacent to the hollow core,
   $PM_{outer\ shell}$ is a precious metal forming the outmost layer of the shell,
   IL is an intermediate layer between $PM_{inner\ shell}$ and $PM_{outer\ shell}$ comprising a base metal/precious metal alloy,
   and wherein the atomic ratio of the base metal (BM) versus the precious metal (PM) in the base metal/precious metal alloy in said intermediate layer decreases towards $PM_{outer\ shell}$ and $PM_{inner\ shell}$,
   and wherein the multilayered structure comprising $PM_{inner\ shell}$, IL and $PM_{outer\ shell}$ is discontinuous.

2. The catalyst particles according to claim 1, wherein the base metal is selected from the group consisting of cobalt (Co), nickel (Ni), copper (Cu) and mixtures and combinations thereof.

3. The catalyst particles according to claim 2, wherein the base metal is nickel (Ni).

4. The catalyst particles according to claim 1, wherein the precious metal in the outer shell ($PM_{outer\ shell}$) and the inner shell ($PM_{inner\ shell}$) is selected from the group consisting of platinum (Pt), palladium (Pd), iridium (Ir) and mixtures, alloys and combinations thereof.

5. The catalyst particles according to claim 1, wherein the outer shell ($PM_{outer\ shell}$) and the inner shell ($PM_{inner\ shell}$) comprise at least 1 atomic layer of precious metal or precious metal alloy.

6. The catalyst particles according to claim 1, wherein the intermediate layer (IL) comprises at least 3 atomic layers of base metal/precious metal alloy $(BM)_x(PM)_y$.

7. The catalyst particles according to claim 1, wherein the medium particle diameter is in the range of 10 to 200 nm.

8. Catalyst compositions for electrochemical applications, comprising the catalyst particles according to claim 1, supported on a support material.

9. The catalyst compositions according to claim 8, wherein the support material is selected from the group consisting of graphites, conductive carbon blacks, graphitized carbon blacks, conductive polymer materials, conductive ceramic materials and mixtures and combinations thereof.

10. A method of preparation of catalyst particles comprising a layered hollow core/shell/intermediate layer/shell structure according to claim 1, comprising the steps:
   a) heating a base metal precursor compound in a polyol solvent at a temperature in the range of 80 to 120° C.,
   b) heating the reaction mixture at a temperature in the range of 165 to 195° C. (180±15° C.) for 2 to 6 hours to form base metal core particles ($BM_{core}$),
   c) adding a precious metal precursor compound to the reaction mixture at a temperature in the range of 150 to 190° C. (170±20° C.) for 10 to 20 hours,
   d) cooling down the reaction mixture and isolating the particles,
   e) treating the particles in an oxidizing acid, and
   f) isolating and purifying the particles.

11. The method according to claim 10 further comprising a heat-up section 1, in which the reaction mixture is heated to the temperature of step a) at a heating rate in the range of 0.5 to 1.0° C./min.

12. The method according to claim 10 further comprising a heat-up section 2, in which the reaction mixture is heated to the temperature of step b) at a heating rate in the range of 3 to 5° C./min.

13. The method according to claim 10, wherein the precious metal precursor compound is added in step c) at an addition rate of <1 mg PM/min per 100 ml of reaction mixture.

14. The method according to claim 10, wherein the polyol solvent is selected from the group consisting of ethylene glycol, 1,2-propylene glycol, 1,3-propylene glycol, dipropylene glycol, diethylene glycol, triethylene glycol, tetraethylene glycol, polyethylene glycol (PEG 200) and mixtures and combinations thereof.

15. The method according to claim 10 further comprising the addition of Pt- or Ir-seed compounds in step a).

16. The method according to claim 10 further comprising the addition of a dispersing agent selected from the group consisting of triethanolamine, sorbitol, gum arabic and pentaerythritol to the reaction mixture.

17. The method according to claim 10, wherein the base metal (BM) precursor is selected from compounds of cobalt (Co), nickel (Ni), copper (Cu) and mixtures and combinations thereof.

18. The method according to claim 10, wherein the base metal precursor is selected from the group of base metal nitrates, carbonates, hydrogen carbonates, sulfates and acetates.

19. The method according to claim 10, wherein the base metal (BM) precursor is nickel(II) carbonate ($NiCO_3$).

20. The method according to claim 10, wherein the precious metal (PM) precursor is selected from platinum(II) compounds, palladium(II) compounds, Iridium(III) compounds, iridium(IV) compounds and mixtures and combinations thereof.

21. The method according to claim 20, wherein the precious metal precursor is a platinum(II) compound being stable towards reduction up to a temperature of >150° C. in the polyol solvent.

22. The method according to claim 21, wherein the platinum (II) compound is selected from the group consisting of:
   platinum(II) tetraammine hydrogencarbonate $[Pt(NH_3)_4(HCO_3)_2]$,
   platinum(II)-tetraethanolamine carbonate $[Pt(EA)_4CO_3]$,
   platinum(II)-tetraethanolamine hydroxide $[Pt(EA)_4(OH)_2]$,
   platinum(II)-diethylenediamine carbonate $[Pt(en)_2CO_3]$,
   platinum(II)-tetraethanolamine oxalate $[Pt(EA)_2(C_2O_4)]$
   and mixtures and combinations thereof.

23. The method according to claim 10, wherein the oxidizing acid is selected from the group consisting of perchloric acid, nitric acid, sulfuric acid, phosphoric acid, acetic acid, and formic acid.

* * * * *